United States Patent [19]
Hindi

[11] Patent Number: 6,089,379
[45] Date of Patent: Jul. 18, 2000

[54] LIQUID FILTRATION MEDIA SUPPORT BELT

[75] Inventor: Ahmad El Hindi, Fayetteville, N.Y.

[73] Assignee: Filter Tech, Inc., Manlius, N.Y.

[21] Appl. No.: 09/050,557

[22] Filed: Mar. 30, 1998

[51] Int. Cl.[7] .......................... B65G 17/06; B01D 33/056
[52] U.S. Cl. .......................... 210/387; 210/400; 210/541; 198/848; 198/851; 198/853
[58] Field of Search .................... 210/400, 401, 210/387, 541; 198/850, 851, 853, 848

[56] References Cited

U.S. PATENT DOCUMENTS

| | | |
|---|---|---|
| 728,390 | 5/1903 | Graham . |
| 1,441,836 | 1/1923 | Davis . |
| 1,883,528 | 10/1932 | Buck . |
| 1,922,908 | 8/1933 | Coleman . |
| 2,735,535 | 2/1956 | Ness . |
| 3,123,202 | 3/1964 | Stevens . |
| 3,785,476 | 1/1974 | Poerink . |
| 3,939,964 | 2/1976 | Poerink . |
| 3,945,487 | 3/1976 | Norton . |
| 4,159,763 | 7/1979 | Kewley . |
| 4,750,920 | 6/1988 | Manuel . |
| 4,812,231 | 3/1989 | Wiesemann . |
| 5,096,053 | 3/1992 | Hodlewsky . |
| 5,105,938 | 4/1992 | Tan . |
| 5,238,565 | 8/1993 | Barcomb . |
| 5,253,749 | 10/1993 | Ensch . |
| 5,305,869 | 4/1994 | Damkjaer . |
| 5,417,850 | 5/1995 | Schimion . |
| 5,547,071 | 8/1996 | Palmaer . |
| 5,551,137 | 9/1996 | Davis . |
| 5,618,415 | 4/1997 | Johnson, Jr. . |

FOREIGN PATENT DOCUMENTS

| | | |
|---|---|---|
| 254604 | 1/1988 | European Pat. Off. . |
| 3505013 | 8/1986 | Germany . |

*Primary Examiner*—Thomas M. Lithgow
*Attorney, Agent, or Firm*—George R. McGuire; Hancock & Estabrook, LLP

[57] ABSTRACT

An endless belt for supporting a continuous web of filter media and moving it through liquid filtration apparatus where a pressure differential is applied across the belt and media. The belt may be fabricated at relatively low cost while retaining the required tensile strength. The belt is formed from a plurality of unique, unitary portions termed "hinge members" which are arranged in longitudinal columns and lateral rows, a plurality of links between each pair of laterally adjacent hinge members and connecting rods extending the full width of the belt through aligned openings in looped portions of the hinge members and openings in the links. The hinge members are preferably formed from a continuous strip of sheet metal by stamping and bending operations, with the links providing added tensile strength.

11 Claims, 7 Drawing Sheets

LIQUID FILTRATION MEDIA SUPPORT BELT

BACKGROUND OF THE INVENTION

The present invention relates to the construction of endless belts used to support a continuous web of liquid-penneable media and to transport the media through filtration apparatus for removing solid contaminants from liquids, typically those used as coolants and lubricants in machining operations, and the like.

Among the filtration systems commonly used to remove solid contaminants from liquids for recycling in machine tool operations are those wherein an endless chain or belt is moved through a tank to which contaminated liquid is supplied. A layer of liquid-previous media is carried on the upper surface of the chain, fresh media being supplied from a roll supported at the rear end of the tank and used media discharged at the front end. The media travels downwardly to some extent from the rear end as it enters the tank and thence upwardly to the front end. Dirty liquid is contained in a pool on the upper surface of the media between the tank side walls or other side structure and sealing means are provided to prevent escape of dirty liquid at the lateral edges of the media. Contaminants are deposited on the surface of the media as it travels through the tank, the clean liquid which passes through the media being collected in the lower part of the tank and pumped back to the location of the machining operation.

The endless belts used in such filtration apparatus are subjected to rather high tensile forces, particularly when a subatmospheric pressure is created in the space below the pool of contaminated liquid on the upper side of the media in order to increase the filtration rate. Consequently, the belt must have a tensile strength adequate to withstand such forces. In general, the higher the strength of the belt, the higher its cost in terms of materials, assembly costs, or both.

It is a principal object of the present invention to provide a continuous belt for use in supporting and transporting filter media in liquid filtration apparatus wherein the strength to cost ratio of the belt is significantly improved. That is, the invention seeks to reduce the cost of endless belts used in liquid filtration apparatus without reducing the tensile strength of the belt or compromising any of its other operational characteristics.

Other objects will in part be obvious and will in part appear hereinafter.

SUMMARY OF THE INVENTION

The belt of the invention includes a plurality of each of three basic elements, herein termed a hinge section, a link and a connecting rod. The hinge section is a unitary piece, preferably formed from a continuous, flat strip of sheet metal, by stamping and bending operations. In its final configuration, each hinge section includes a plurality of parallel, laterally spaced, elongated members integral at opposite ends with a transverse strip extending the full width of the hinge section. Extending integrally from each transverse strip, aligned with but wider than each of the laterally spaced portions, are looped portions, i.e., initially linear strips which are bent to form laterally spaced, open loops of equal diameter. An equal number of loops are formed at each end, all loops being on the same side of the hinge section. That is, all loops lie below the plane of what is termed the upper side of the hinge section.

The links are also preferably formed as sheet metal stampings having a thickness greater than that of the strip from which the hinge sections are formed. Each link is elongated between opposite, curved ends and has a through opening adjacent each end. Preferably, the links include a third opening, centrally located between the two end openings, to provide means for mounting a threaded insert for attaching an edge seal strip along each side of the belt, although the threaded inserts and edge seal strips are not considered parts of the belt, per se.

The belt is assembled by placing the hinge sections and links in side-by-side and end-to-end relation with a plurality of links between each pair of laterally adjacent hinge sections. A plurality of links (with no hinge sections) also make up each lateral side of the belt in the areas under the edge seals. The loops on the leading end of each hinge section are placed in the spaces between the loops on the trailing end of the forwardly adjacent section, and the openings in the ends of the links are likewise axially aligned with the openings formed by the hinge section loops. The connecting rods are then inserted through the openings, extending the full width of the belt, and secured by a nut on a threaded end of the rod. The hinge sections, relatively low cost for their size, occupy the majority of the belt area, and the links provide tensile strength in excess of that of the hinge sections, thus providing a belt having both high strength and relatively low cost.

The foregoing and other features of construction and assembly of the belt components will be more readily understood and filly appreciated from the following detailed disclosure of the preferred embodiment, taken in conjunction with the accompanying drawings.

DETAILED DESCRIPTION

Figure 1:
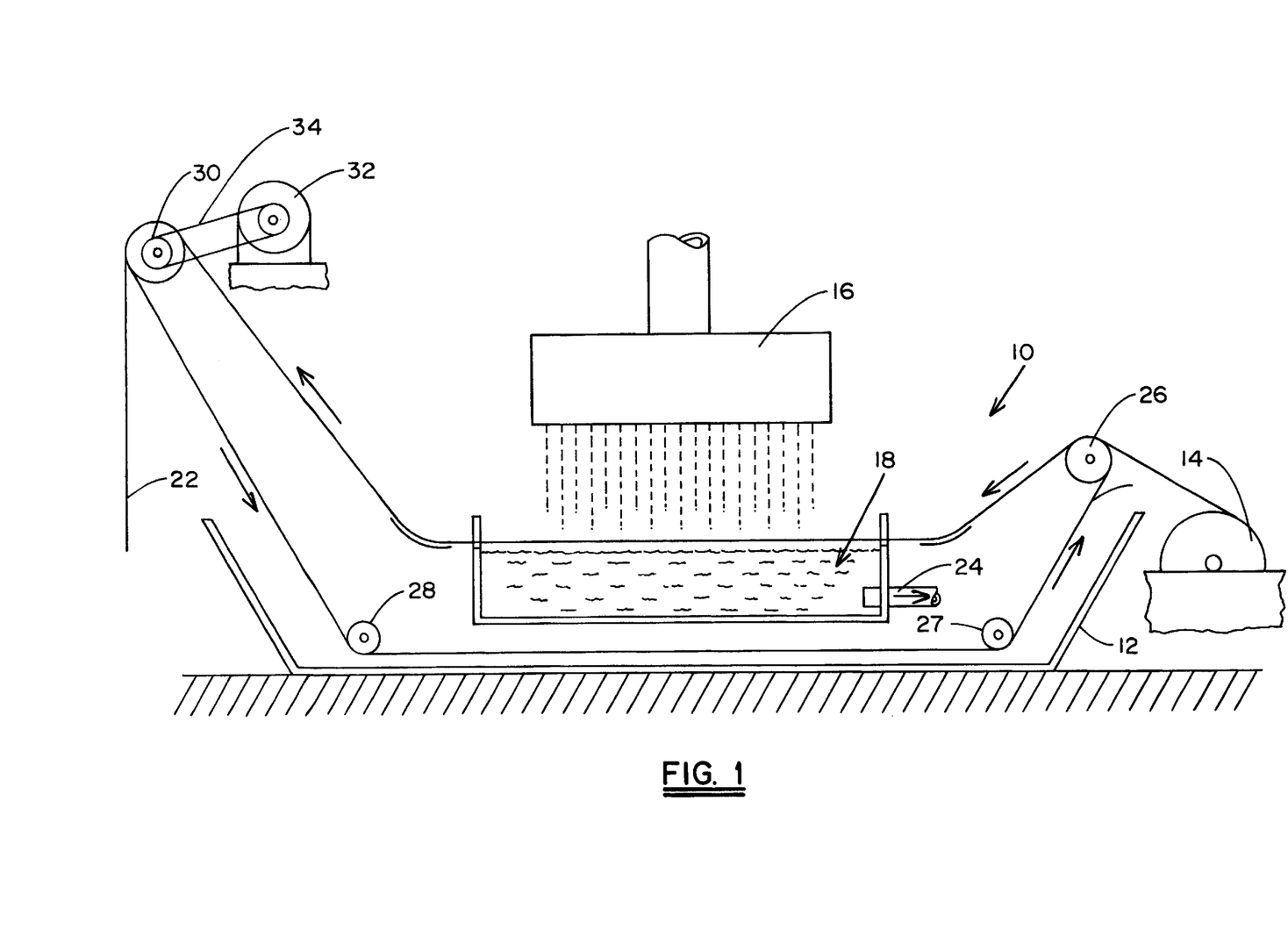
FIG. 1 is a somewhat diagrammatic, side elevational view of a typical form of liquid filtration apparatus, showing the general environment wherein the invention is employed.

Referring now to the drawings, in FIG. 1 is seen a typical form of filtration apparatus, denoted generally by reference numeral 10, used to separate solid contaminants from liquids such as coolants and lubricants used in machining operations. Apparatus 10 includes means for supporting at one end of tank 12 a supply roll 14 of liquid-previous media for movement through the tank as dirty liquid, deposited through manifold 16, flows through the media into clean liquid compartment 18. Flow rate is increased by reducing the pressure in compartment 18 by conventional means. The media is supported upon the upper run of endless belt 20 and moved thereby through tank 12 with used media and contaminants thereon exiting the other end of the tank as indicated at 22. Clean liquid is withdrawn through line 24 and returned to the applicable location for reuse.

It will be understood that apparatus 10 is merely a general example of the environment in which endless belt 20 is intended for use. In this example, belt 20 passes around smooth idler rollers 26, 27, 28 and drive roller 30. The required driving torque is applied by a suitable electric motor 32 and transmitted through chain 34 to a sprocket on one end of drive roller 30. Belt 20, the structure of which forms the subject matter of the present invention, is moved in a manner described hereinafter, by drive roller 30 in a counterclockwise direction as viewed in FIG. 1.

Figure 2:
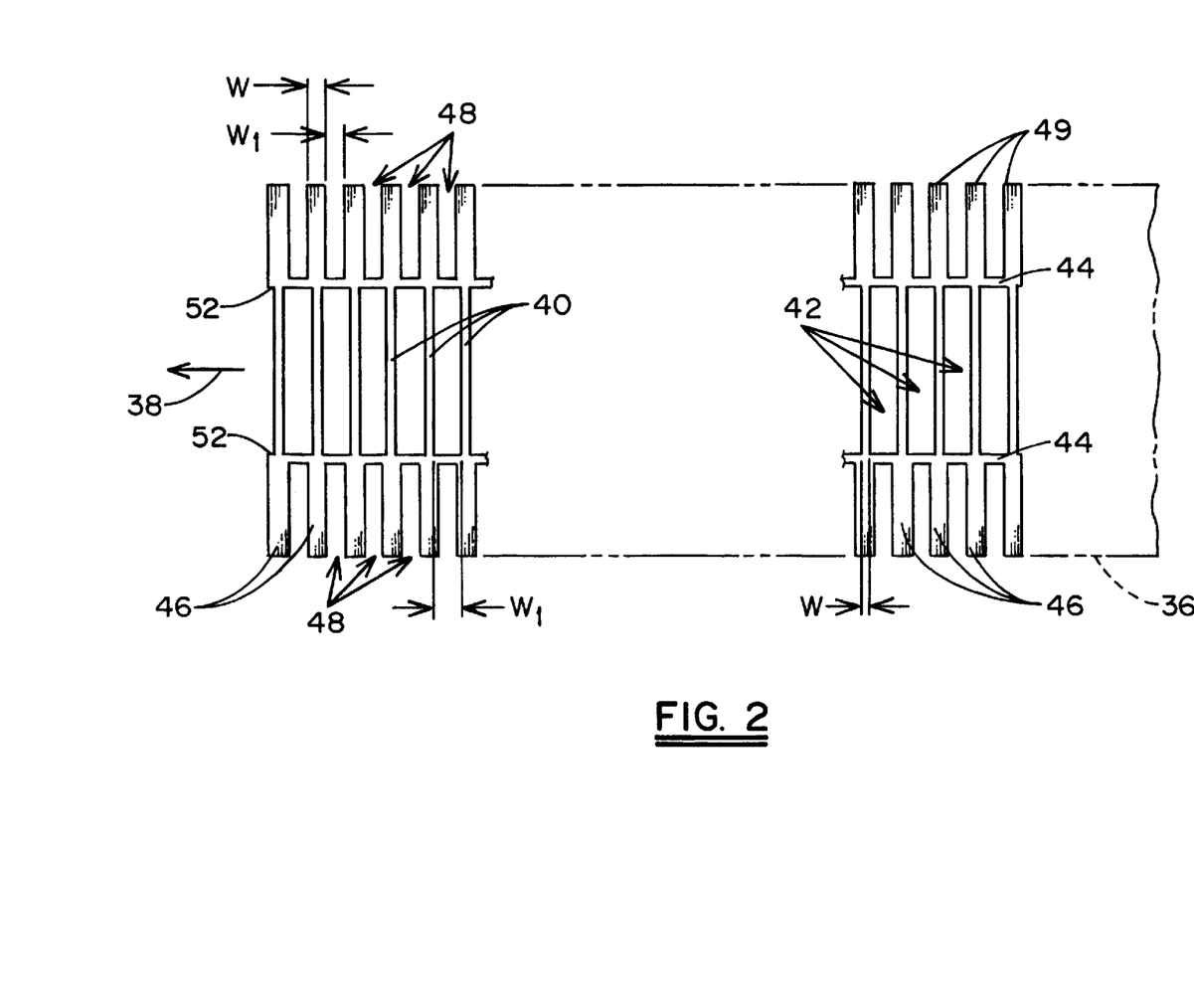
FIG. 2 is a plan view showing a strip of sheet metal being stamped and cut as a preliminary step in the formation of the hinge section element of the belt.

Turning now to FIG. 2, strip 36 of sheet metal is fed in the direction of arrow 38 as it undergoes a stamping operation to remove selected portions. Upon stamping, the metal is removed in rectangular segments to provide a plurality of laterally spaced, parallel, elongated members 40 separated by open spaces 42. Members 40 are of substantially equal width, thickness and length, being integral at opposite ends with transverse strips 44. Also integral with strips 44, on the sides thereof opposite members 40, are members 46, separated by spaces 48. Each of members 46 has a terminal end 49. Individual pieces are severed from the stamped strip by cutting members 44 adjacent the edges of a pair of longitudinally aligned members 46, e.g., along line A—A, providing a severed piece having the desired number of members 40 and 46.

Figure 3:
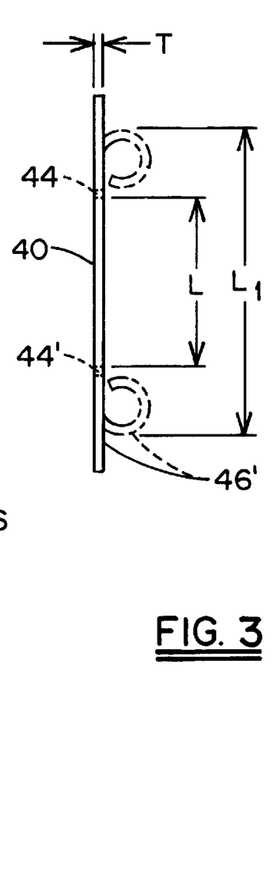
FIG. 3 is a side elevational view of a hinge section, illustrating bending steps in its formation.
Figure 4:
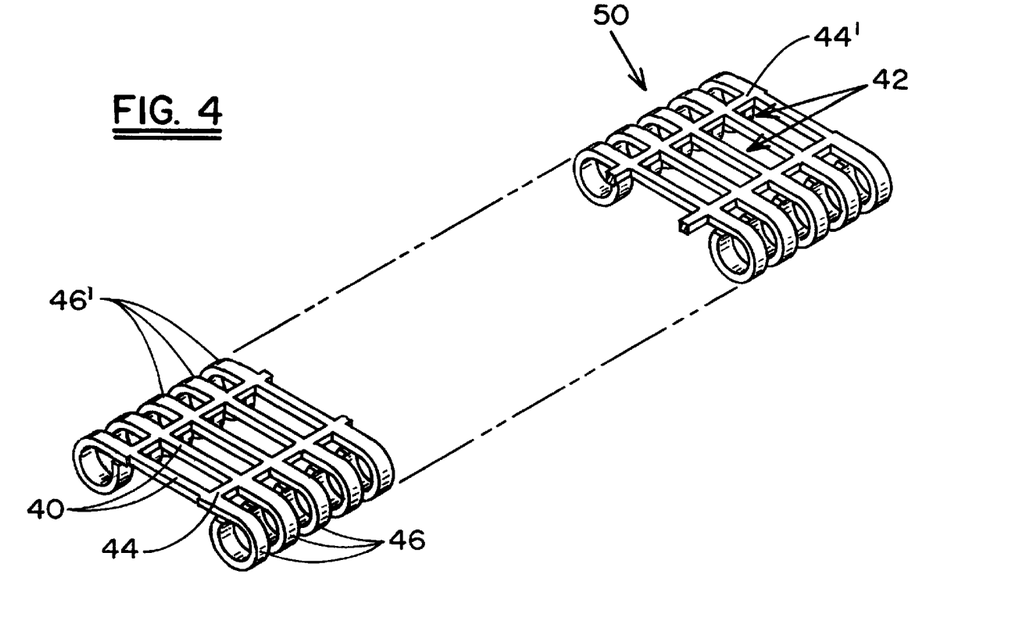
FIGS. 4 and 5 are perspective views, taken from the top and bottom sides, respectively, of the hinge section.
Figure 5:
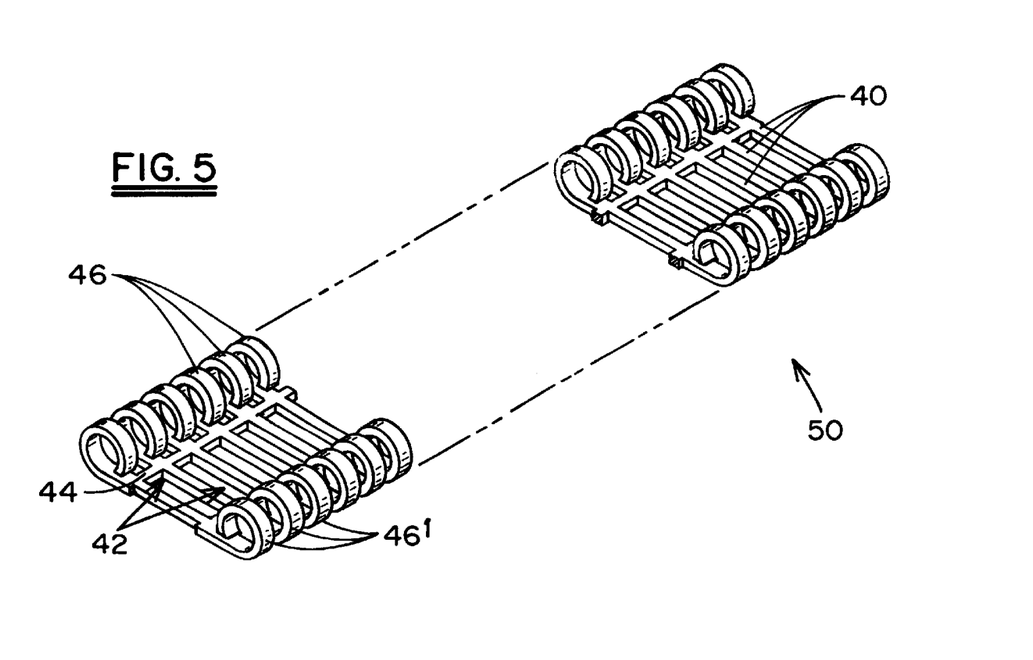

One of the severed pieces, termed a hinge section and denoted generally by reference numeral 50, is shown in FIGS. 3–5. Each of hinge sections 50 includes two transverse strips, indicated by reference numerals 44 and 44', having members 46 and 46', respectively, extending therefrom. Members 46, 46' are shown in FIG. 3 in solid lines in their linear form, as severed from sheet metal strip 36, and in phantom lines after being bent around mandrels to form individual loops. Hinge section 50 is shown in FIGS. 4 and 5 from what are termed its upper and lower sides, respectively, wherein it is seen that all of the loops lie on the lower side of the hinge section with the upper sides of the loops coplanar with the upper sides of members 40 and strips 44, 44'.

Figure 10:
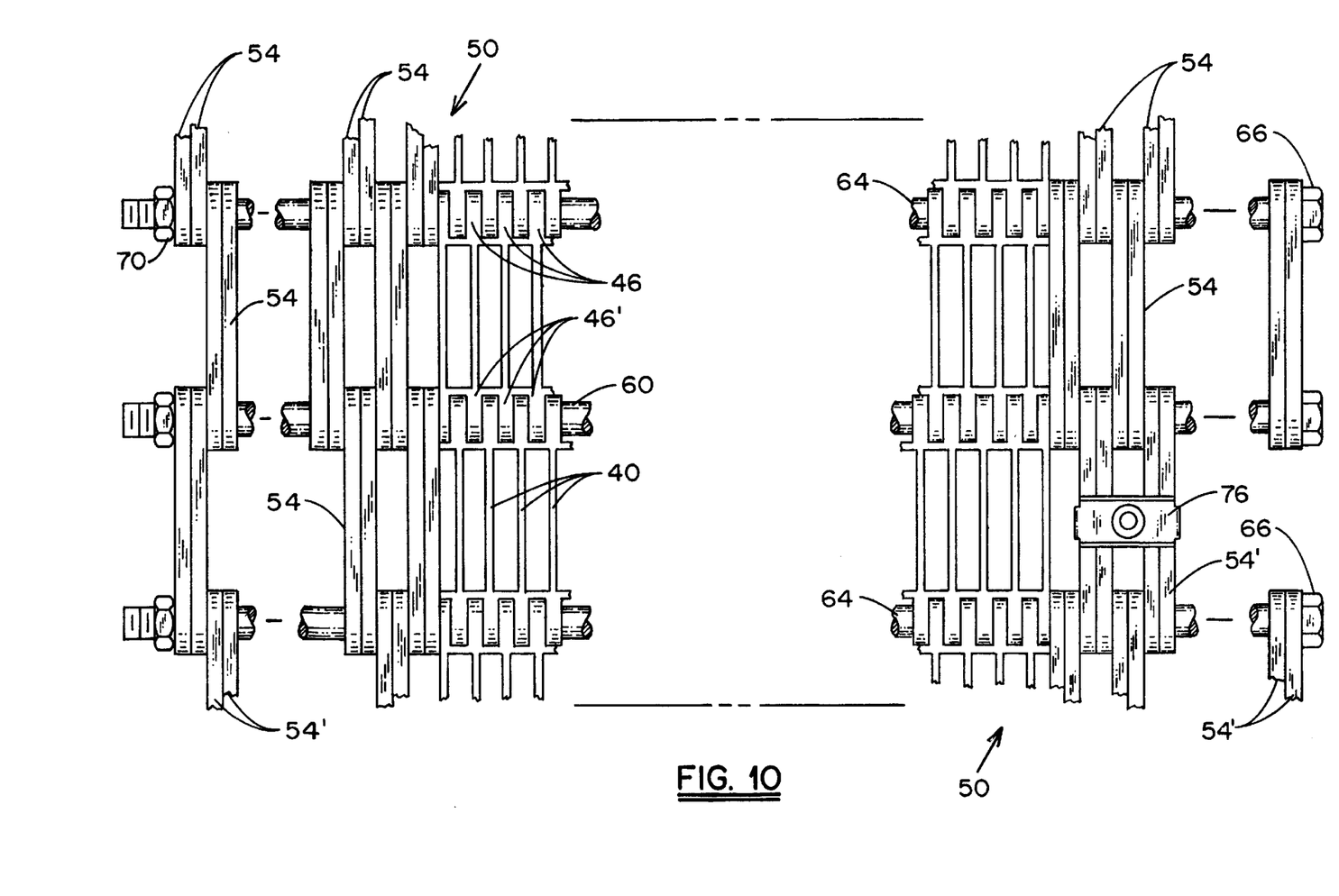
FIG. 10 is an enlarged fragment of FIG. 9.

Several dimensions of hinge section 50 and individual portions thereof are indicated in FIGS. 2 and 3. Being formed from a strip of sheet metal, all portions of hinge section 50 are of uniform thickness T. The number of members 40 is equal to the number of members 46, 46' on each end of the hinge section. Each of members 40 has a longitudinal centerline X—X common with the centerline of members 46, 46' on opposite ends thereof. The width W of members 46, 46' is greater than the width w of members 40. Consequently, there is a small, stepped shoulder between the ends of strips 44, 44' and the outermost members 40, such shoulders being indicated in FIG. 2 by reference numeral 52. If desired, shoulders 52 may be eliminated by making the outer edges of the outermost members 40 co-linear with the outer edges of the outermost members 46, 46', thus making the outermost members 40 slightly wider than the width w of the other members 40, as in FIGS. 4, 5 and 10. The width of the spaces between members 40 is indicated by dimension w, and the space between members 46, 46' by dimension $W_1$. Members 40 have a length L, and the overall length of hinge section 50 is denoted $L_1$. Length L is preferably greater than half of length $L_1$.

Figure 6:
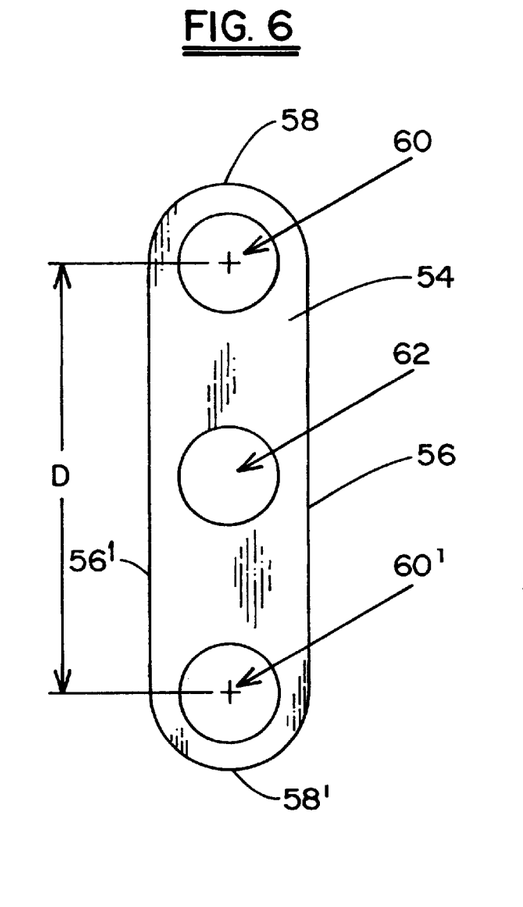
FIGS. 6 and 7 are front and side elevational views, respectively, of one of the link elements used in the belt construction.
Figure 7:
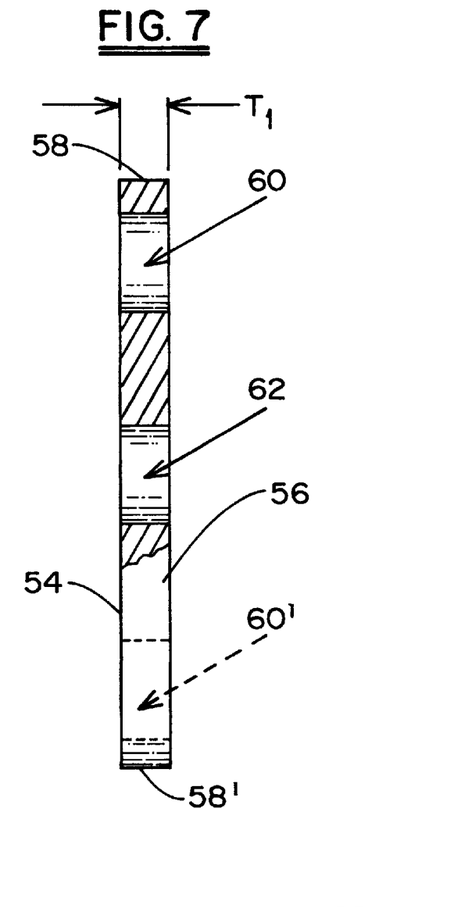

In FIGS. 6 and 7 is seen link element 54, also preferably a sheet metal stamping having thickness $T_1$, greater than thickness T of hinge section 50. Link 54 has parallel sides 56, 56' and rounded ends 58, 58'. Through openings 60, 60' are formed concentrically adjacent ends 58, 58', respectively. Opening 62, of diameter equal to openings 60, 60' is formed midway there-between. The distance D between the centers of openings 60, 60' is equal to the distance between the axes of the loops formed by members 46 and 46'.

Figure 8:
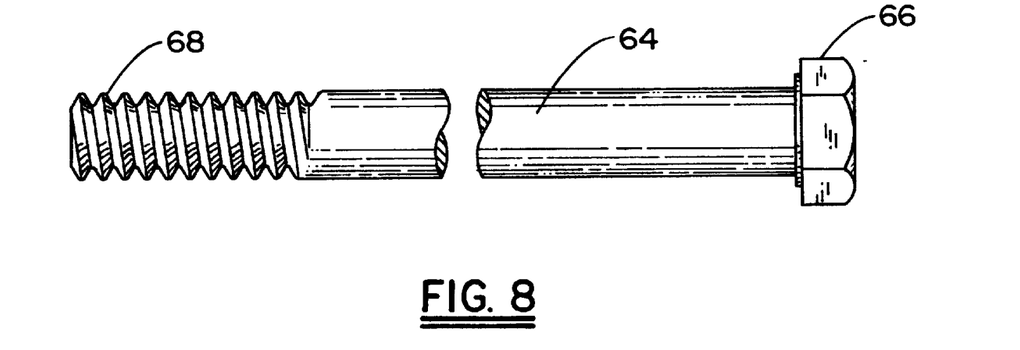
FIG. 8 is an elevational view of one of the connecting rods.

Connecting rod 64, another element of the belt structure, is shown in FIG. 8. Rod 64 is formed from metal bar stock with head 66 integrally formed at one end and threaded portion 68 at the other. Preferably, rod 64 is tapered inwardly over a portion of its length toward the threaded end.

Hinge sections 50, links 54 and rods 64 are assembled to construct belt 20 with the aid of a jig, as is customary in such assembly procedures. A pair of hinge sections 50 are placed with the loops formed by members 46 of one section in the spaces 48 between and coaxial with the loops formed by members 46' of the other section. Width $W_1$ is at least as great as width W, whereby the hinge sections may be so positioned without interference. A plurality of links 54 are then placed with openings 60 and 60' in coaxial alignment with the loops formed by members 46, 46'. Preferably, links 54 are positioned in pairs with their major surfaces in face-to-face contact; the links of alternating pairs, denoted in FIG. 10 by reference numerals 54 and 54', extend in opposite directions from the connecting rod by which they are commonly coupled.

Pairs of links 54, 54' are placed with aligned openings 60 of one pair aligned with openings 60' of the laterally adjacent pairs between each two laterally adjacent hinge sections 50. In the construction shown in FIG. 10, four pairs of links 54, 54' are positioned between each laterally adjacent pair of hinge sections 50 although this number may vary depending upon the required tensile strength per unit of width of belt 20. This value may be obtained from the known yield strength of the metal from which hinge sections 50 and links 54 are fabricated and the dimension of these elements at their smallest (weakest) cross sections. In any case, the tensile strength per unit of belt width is considerably greater in the areas of the links than in that of the hinge sections.

Figure 9:
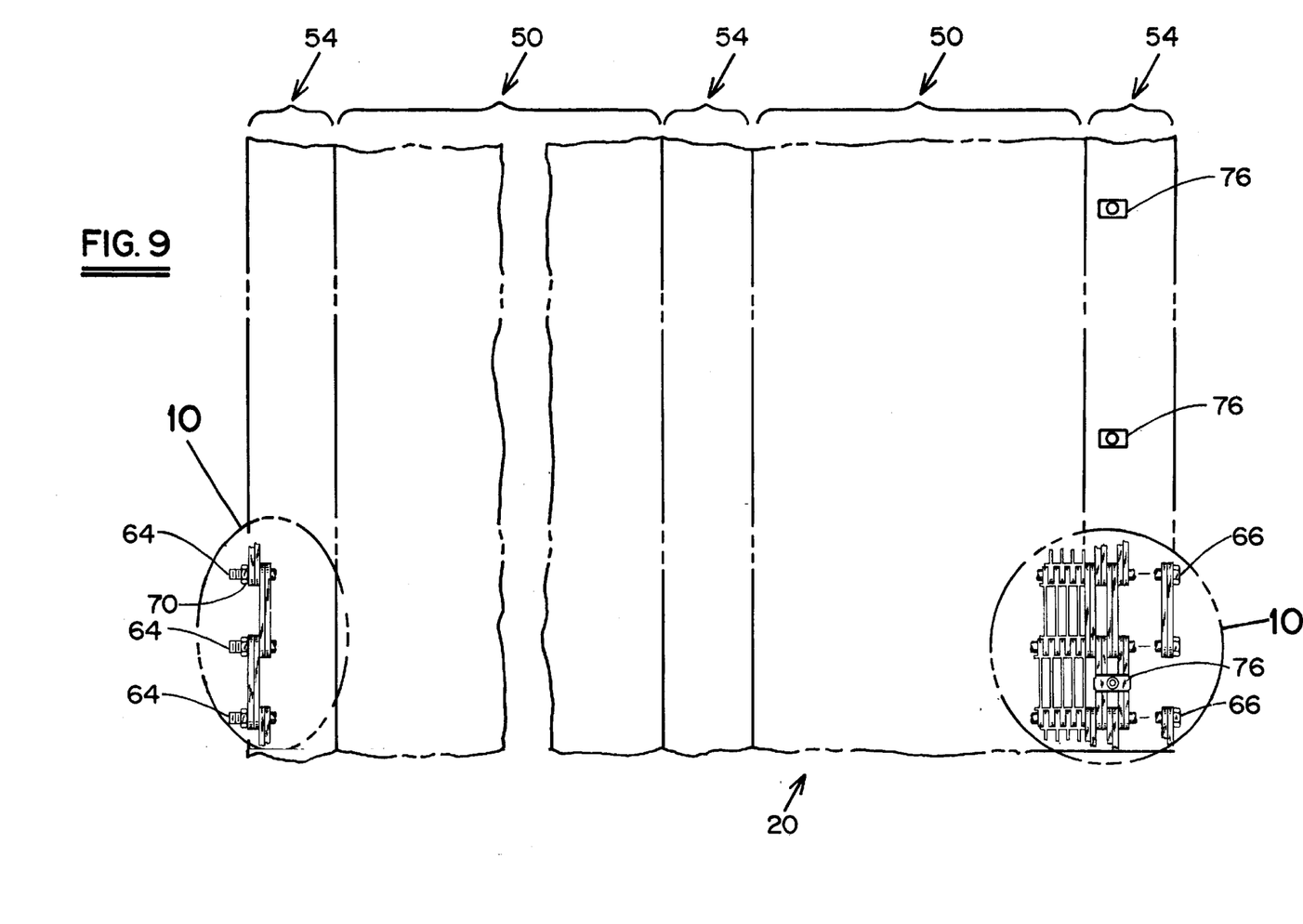
FIG. 9 is a fragmentary, plan view of a portion of the fully assembled belt.

When the hinge sections and links have been laterally aligned in the desired numbers, one of the connecting rods 64 is passed through the aligned openings. The length of rods 64 is equal to the width of belt 20, plus the thickness of head 66 and at least a length of threaded portion 68 to permit engagement of a nut 70 on the end of each rod, as shown in FIG. 9. The taper at the threaded end of the rod facilitates insertion thereof to connect the hinge sections and links across the full width of the belt. It will also be noted in FIG. 9 that the number of laterally adjacent links 54 along each side of the belt is greater than the number between laterally adjacent hinge sections.

When the belt has been assembled to the desired length it is placed around the drive and idler rolls of the filtration apparatus, as shown in FIG. 1, and the leading and trailing ends are connected by an additional connecting rod. The hinge sections are thus arranged in longitudinal columns and lateral rows with a plurality of links between each laterally adjacent pair of hinge sections. The hinge sections are relatively cheap and easy to assemble, but the links are required to impart the necessary tensile strength which increases proportionately to the pressure differential applied across the media and belt.

Figure 11:
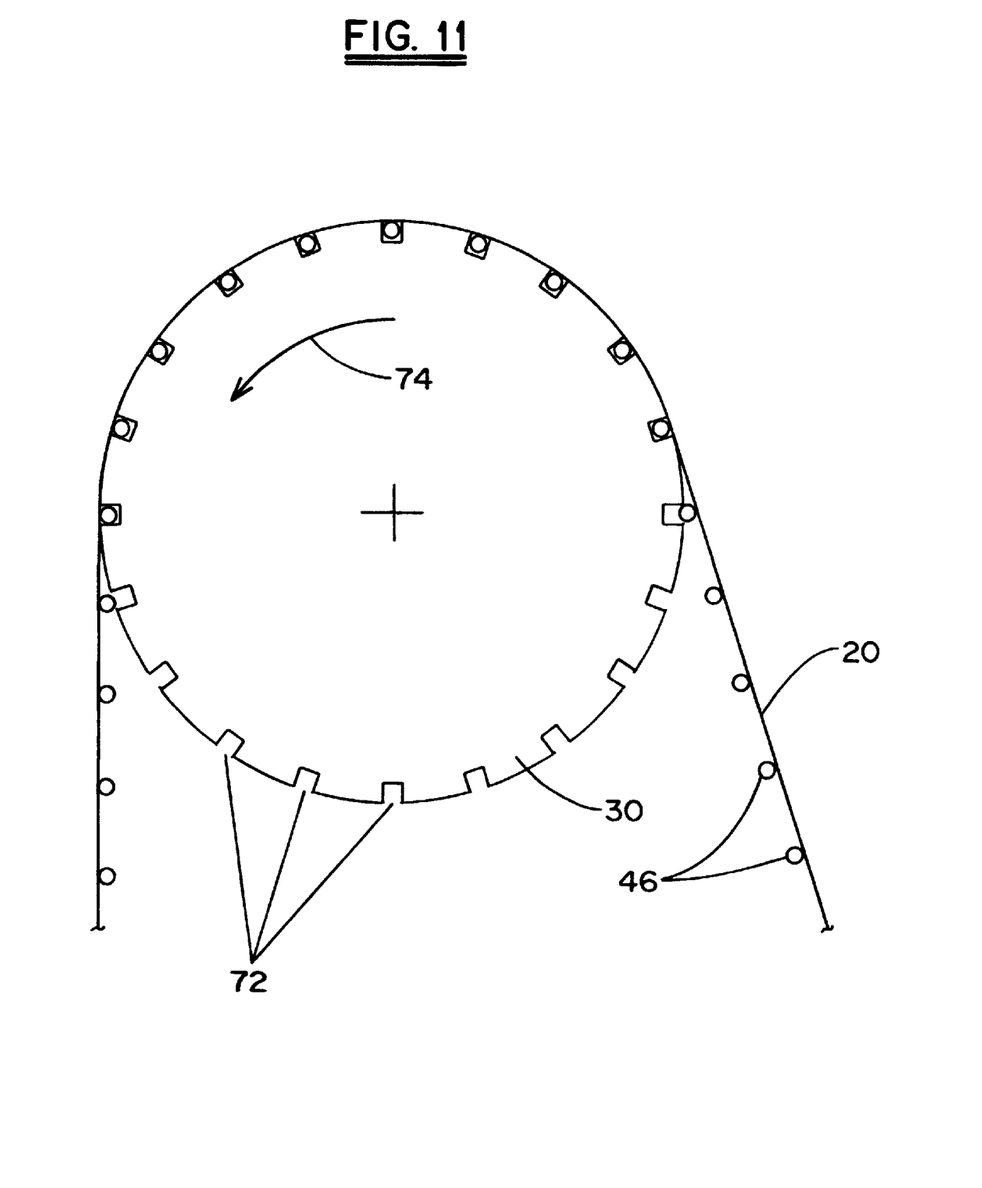
FIG. 11 is a fragmentary, side elevational view showing the manner of movement of the belt by a drive roller.

The preferred drive system for belt 20 is illustrated in FIG. 11. A succession of evenly spaced, square-sided grooves 72 extend axially across the surface of drive roller 30. Grooves 72 are sized and spaced to receive successive loops formed by members 46, 46', whereby belt 20 is moved about its prescribed path as roller 30 is rotated in the direction of arrow 74. While it is desirable to maximize the length $L_1$ of the hinge sections in order to use as few as possible per unit of belt length, thus saving on parts and assembly, any increase in hinge section length requires an increase in the diameter of drive roller 30. This, in turn, increases the torque required to rotate drive roller 30 and thus the size and cost of the drive motor.

Finally, it will be noted that the purpose of center openings 62 in links 54 is to provide a means for mounting threaded inserts on selected links along the sides of belt 20. Three such inserts, one of which is indicated by reference numeral 76, are shown adjacent the right side of the belt in FIG. 9. A so-called moving seal, in the form of a continuous strip of material which cooperates with stationary structure on the sides of the tank to form a liquid seal at the edges in conventional fashion, is secured to inserts 76 to cover the links at each lateral side of belt 20.

What is claimed is:

1. An endless belt for supporting and moving a layer of permeable media through a liquid filtration tank, said belt comprising:
   a) a plurality of hinge sections arranged in longitudinal columns and lateral rows, each of said hinge sections including:
      i) a plurality of longitudinally extending, parallel, linear members having first and second ends and upper surfaces in a common plane and laterally separated from one another by an open space;
      ii) first and second pluralities of curved members each forming a substantially closed loop about first and second axes, respectively, outwardly adjacent said first and second ends, respectively, parallel to and on the same side of said common plane, said curved members being positioned entirely on said same side of said common plane; and
      iii) means joining said linear and curved members in a unitary, integral structure;
   b) a plurality or relatively flat links elongated between first and second ends and having first and second through openings substantially adjacent said first and second ends, respectively, and a third through opening positioned between said first and second openings, at least one of said links being positioned between laterally adjacent ones of said hinge sections in each of said rows with said openings respectively aligned with said first and second axes; and
   c) a plurality of elongated connecting rods, one of which extends through all of said aligned loops and openings of said hinge sections and links, respectively, in each of said rows, hingedly connecting all hinge sections and links of each row to those of the next succeeding row.

2. The endless belt of claim 1 wherein said joining means comprises a first, laterally extending member integrally joined on one side with said first end of each of said linear members and on the other side with said first plurality of curved members, and a second, laterally extending member integrally joined on one side with said second end of each of said linear members and on the other side with said second plurality of curved members.

3. The endless belt of claim 2 wherein the thicknesses of said linear members, said curved members and said first and second laterally extending members are equal.

4. The endless belt of claim 3 wherein said hinge sections are each fabricated from an integral blank of sheet metal.

5. The endless belt of claim 4 wherein the size of said open spaces between said linear members is equal.

6. The endless belt of claim 5 wherein the yield strength of one of said links is at least twice the yield strength of one of said linear members.

7. The endless belt of claim 6 wherein the numbers of said first and second pluralities of said curved members are equal to one another and to the number of said linear members.

8. The endless belt of claim 4 wherein said linear members are of equal length, greater than one-half the overall length of said hinge sections.

9. The endless belt of claim 8 wherein at least two of said links are positioned between each laterally adjacent pair of said hinge sections.

10. The endless belt of claim 9 wherein a plurality of said links are positioned along each lateral edge of said belt, outwardly of the outermost of said columns of hinge sections.

11. The endless belt of claim 10 wherein the lateral width of said hinge sections is at least four times the combined lateral width of said links positioned between each lateral pair of said hinge sections.

* * * * *

UNITED STATES PATENT AND TRADEMARK OFFICE
CERTIFICATE OF CORRECTION

PATENT NO. : 6,089,379　　　　　　　　　　　　　　　　　　　　Page 1 of 1
DATED : July 18, 2000
INVENTOR(S) : Ahmad El Hindi It is certified that error appears in the above-identified patent and that said Letters Patent is hereby corrected as shown below:

Claim 1,
Line 41, delete "or" and substitute therefor -- of --.

Signed and Sealed this

Eighteenth Day of December, 2001

Attest:

JAMES E. ROGAN
Attesting Officer　　　　Director of the United States Patent and Trademark Office